United States Patent
Malm

[11] Patent Number: 5,472,095
[45] Date of Patent: Dec. 5, 1995

[54] SCREENING CYLINDER

[75] Inventor: Jan Malm, Grästorp, Sweden

[73] Assignee: AB Knufsilplatar, Sweden

[21] Appl. No.: 242,304

[22] Filed: May 13, 1994

[30] Foreign Application Priority Data

May 14, 1993 [SE] Sweden .................................. 9301661

[51] Int. Cl.⁶ .................................................. B07B 1/22
[52] U.S. Cl. ............................ 209/303; 209/305; 209/395; 209/406
[58] Field of Search ........................... 209/303–306, 209/393, 395, 406, 407, 288, 289, 294, 299

[56] References Cited

U.S. PATENT DOCUMENTS

| | | | |
|---|---|---|---|
| 2,850,165 | 9/1958 | Hesse et al. | 209/395 X |
| 3,561,605 | 2/1971 | Likness | 209/306 X |
| 4,136,832 | 1/1979 | Morita et al. | 209/294 X |
| 4,155,841 | 5/1979 | Chupka et al. | 209/306 X |
| 4,236,999 | 12/1980 | Burgess et al. | 209/294 X |
| 4,487,695 | 12/1984 | Connolly | 209/393 X |
| 4,846,971 | 7/1989 | Lamort | 209/395 X |
| 4,885,090 | 12/1989 | Chupka et al. | 209/306 X |
| 5,011,065 | 4/1991 | Musselmann . | |
| 5,041,212 | 8/1991 | Gero et al. | 209/305 X |
| 5,255,790 | 10/1993 | Einoder et al. | 209/393 |

FOREIGN PATENT DOCUMENTS

| | | | |
|---|---|---|---|
| 67912A1 | 12/1982 | European Pat. Off. . | |
| 0316570 | 5/1989 | European Pat. Off. | 209/395 |
| 3327422 | 2/1985 | Germany . | |

Primary Examiner—D. Glenn Dayoan
Attorney, Agent, or Firm—Lerner, David, Littenberg, Krumholz & Mentlik

[57] ABSTRACT

Screening cylinders for screening lignocellulose-containing fibrous material are disclosed. The cylinders are formed from longitudinal bars separated by gaps, and support rings extending around the circumference of the cylinders to support the bars, as well as longitudinal strips whose outer surfaces are a greater distance from the support rings than are the bars.

18 Claims, 3 Drawing Sheets

SCREENING CYLINDER

FIELD OF THE INVENTION

The present invention relates to screening cylinders. More particularly, the present invention relates to screening cylinders for devices used in connection with screening suspensions of lignocellulose-containing fibrous material.

BACKGROUND OF THE INVENTION

The object of screening suspensions of fibrous materials is to separate coarse particles in the form of shives, fibrous bundles and other impurities from the fibrous material itself, or to fractionate same, i.e., to separate long and short fibers from each other. The screening normally is carried out in screening devices comprising a stationary or rotary screening cylinder. The screening cylinder is provided with apertures or slits, through which the fibers, but not the impurities, can pass.

Screening cylinders of this type are normally manufactured by drilling apertures or milling slits in a metal sheet, which is then formed into a cylinder. In order to obtain an open area as large as possible, the apertures or slits must be arranged rather densely.

In another method of forming such screening cylinders, the cylinder is made of bars, which are held together by supporting rings in a manner such that gaps are formed between the bars, and these gaps extend along the entire length of the cylinder. Such a screening cylinder has many advantages over a conventionally slitted screening cylinder. For example, they possess a greater open area and a higher selectivity with respect to shive separation and fractionating. Alternatively, the bars can be formed of a metal sheet by arranging a great number of parallel grooves therein.

It can also be advantageous to form the surface of the screening cylinder in such a manner that the upstream edges of the gaps are located on a higher level than the downstream edges, as seen in the direction of the relative motion of the suspension. This offers many advantages from the point of view of a screening. Screening cylinders comprising gaps of this type have, for example, a higher capacity and a high capability of Shives separation. In certain cases, however, such as when capacity is the main priority, it can be desirable to form a planar screen surface, or in a manner such that the downstream edges are located higher than the upstream edges.

By forming the screening cylinder according to the present invention, it is now possible to additionally improve the efficiency and runnability of the screening device.

SUMMARY OF THE INVENTION

In accordance with the present invention, these and other objects have now been accomplished by the invention of an apparatus for screening suspensions of lignocellulose-containing fibrous material comprising a plurality of longitudinally extending bar elements separated by predetermined gaps formed therebetween and having an inner surface and an outer surface, the bar elements formed into a screening cylinder, the predetermined gap thereby extending along the entire length of the screening cylinder, a plurality of supporting rings disposed circumferentially about the screening cylinder to support the plurality of bar elements in the form of the screening cylinder, and a plurality of longitudinally extending strip members having an inner surface and an outer surface, the outer surfaces of the plurality of longitudinally extending strip members being disposed a first predetermined distance from the plurality of supporting rings and the outer surfaces of the plurality of bar elements being disposed a second predetermined distance from the plurality of supporting rings, the first predetermined distance being greater than the second predetermined distance. In accordance with a preferred embodiment, the plurality of supporting rings support the inner surfaces of the plurality of bar elements.

In accordance with another embodiment of the apparatus of the present invention, the plurality of longitudinally extending strip members are arranged substantially axially with respect to the screening cylinder. In another embodiment, however, the plurality of longitudinally extending strip members are arranged at a predetermined angle with respect to the axial direction of the screening cylinder.

In accordance with another embodiment of the apparatus of the present invention, the inner surfaces of the plurality of longitudinally extending strip members are arranged in contact with the plurality of support rings. In another embodiment the inner surfaces of the plurality of longitudinally extending strip members are arranged in contact with the outer surfaces of the plurality of bar elements.

In accordance with a preferred embodiment of the apparatus of the present invention, the outer surfaces of the plurality of bar elements form an oblique angle with respect to the circumferential direction of the screening cylinder. Preferably, the oblique angle is between about 0° and 45°, more preferably between about 10° and 30°.

BRIEF DESCRIPTION OF THE DRAWINGS

The following detailed description of the present invention can be more readily understood with reference to the accompanying drawings, in which.

DETAILED DESCRIPTION

Figure 1:
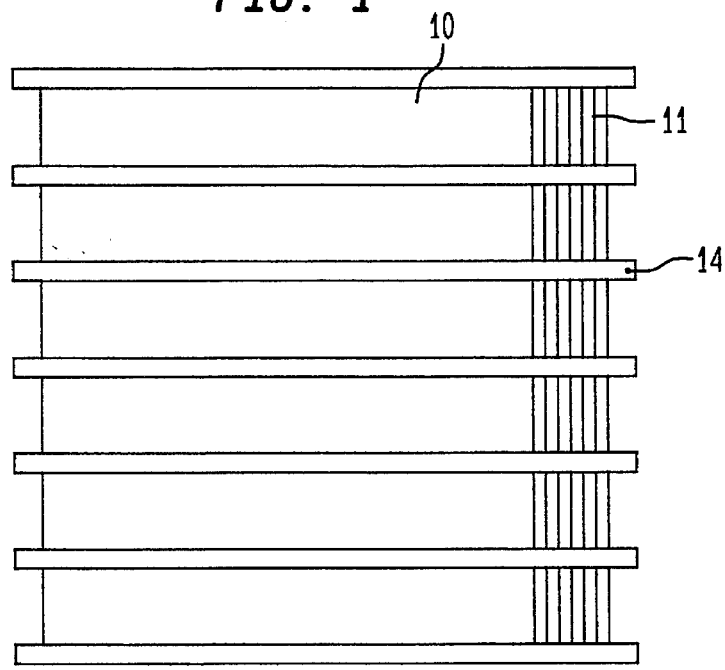
FIG. 1 is a side, elevational, partial view of a screening cylinder in accordance with the present invention.

Referring to the Figures, in which like numerals refer to like portions thereof, the screening cylinder 10 of the present invention is formed from a large number of substantially bar-shaped portions or elements 11, which between themselves form gaps 12 extending along the entire length of the cylinder. The bar-shaped portions 11 are positioned such that a screen surface is formed where the edges of the gaps are located at different heights, preferably so that the upstream edge lies higher than the downstream edge, as seen in the intended direction of motion of the suspension relative to the screening cylinder. This can preferably be brought about by providing the bar-shaped portions 11 with an oblique upper surface 13, for example, by bevel grinding or inclination of these portions. The angle $\alpha$ of this oblique upper surface 13 can be between about 0° and 45°, preferably between about 10° and 30°, in relation to the circumferential direction of the screen surface. The difference in level between the edges should be between about 0 and 5 mm. The width of the gaps 12 should be from about 0.05 to 1.0 mm, preferably from about 0.1 to 0.5 mm, and the bar-shaped portions should have a width of from about 0.5 to 7 mm. Alternatively, the edges of the gaps can be located on the same level, or in a manner such that the downstream edge is located higher than the upstream edge. The ranges of dimensions stated above also apply in these latter cases.

Figure 6:
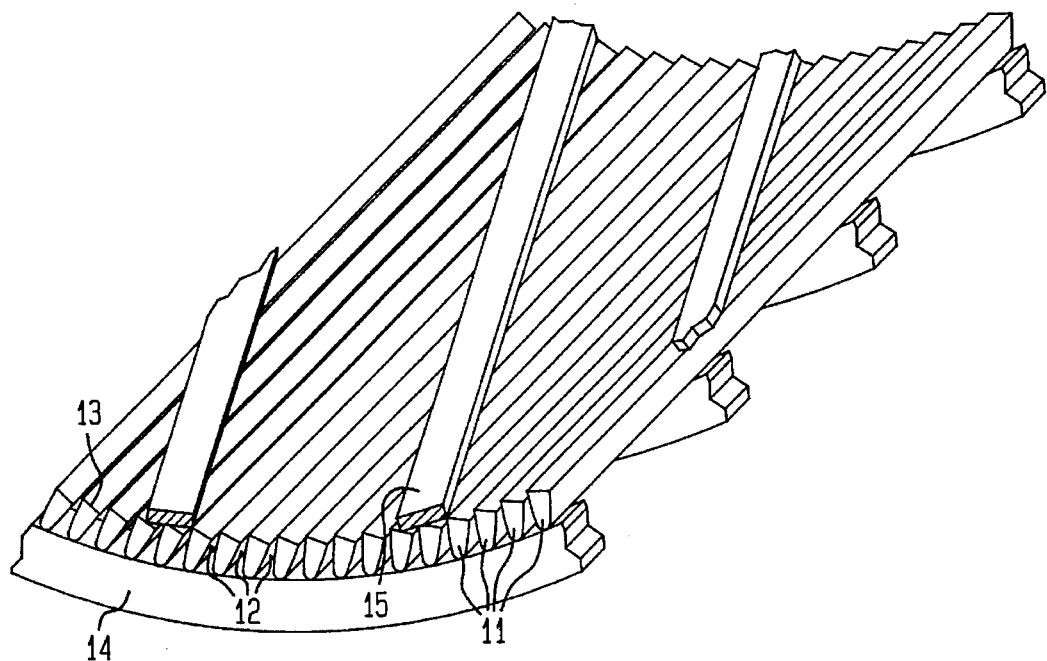
Figure 7:
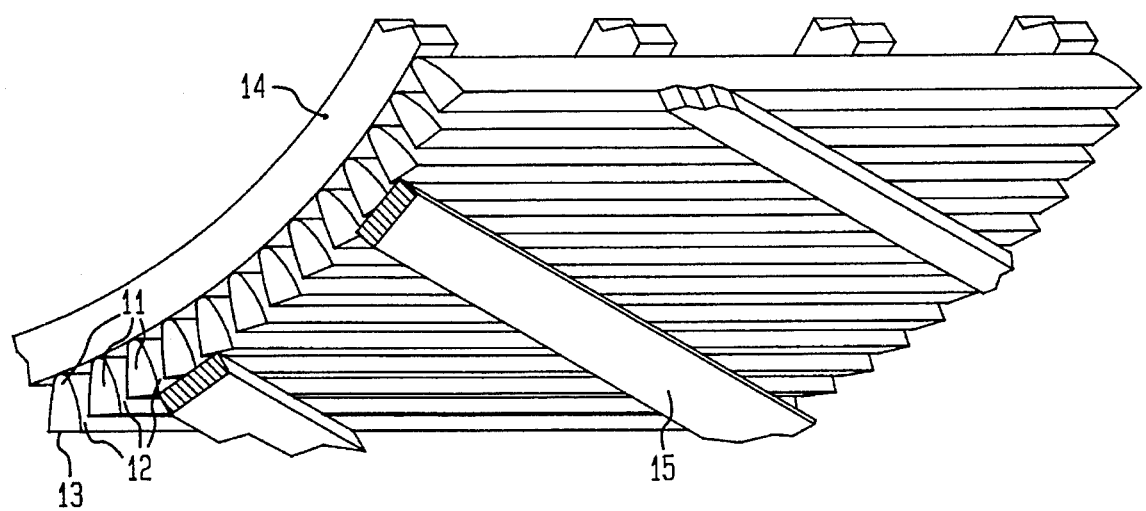

In the embodiments shown in the drawings, which relate to screening cylinders used for inside-outward screening, the bar-shaped portions 11 are held together by a plurality of supporting rings 14 arranged on the outside of the cylinder and extending entirely about the same. The rings preferably are attached by welding. The cylinder is provided on its inside with a plurality of strips 15 extending along the entire length of the cylinder or parts thereof, and inward in a manner so as to be located at some distance above the bar-shaped portions 11. These strips 15 can be axial, or they can form angles with the axial direction of the screening cylinder as shown in FIGS. 6 and 7.

When the cylinder is intended for use in connection with outside-inward screening, the overall supporting rings 14 are located on the inside of the cylinder, and the strips 15 are located on the outside thereof.

Figure 2:
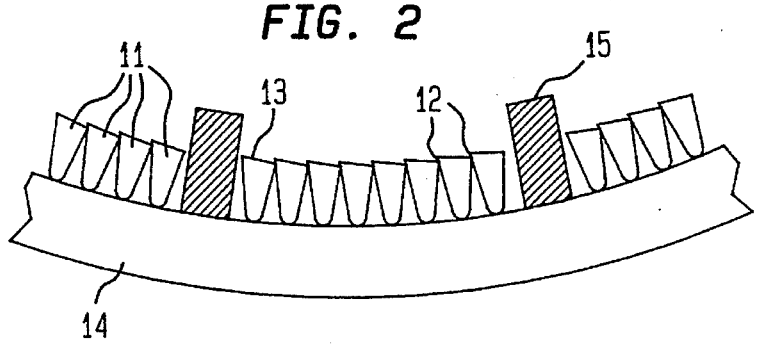
FIG. 2 is a partial, side, cross-sectional view of a portion of one embodiment of a screening cylinder according to the present invention.
Figure 3:
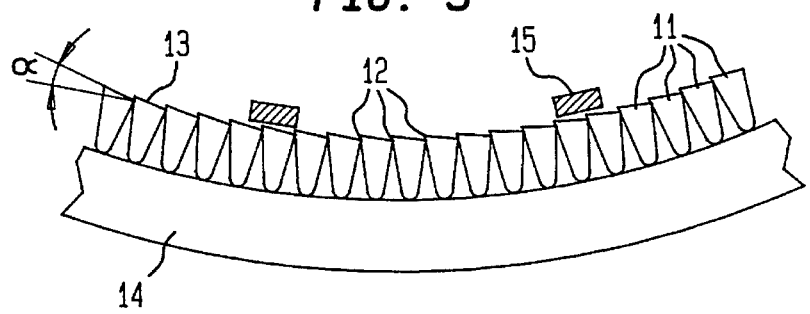
FIG. 3 is a partial, side, elevational view of a portion of another embodiment of a screening cylinder in accordance with the present invention.
Figure 4:
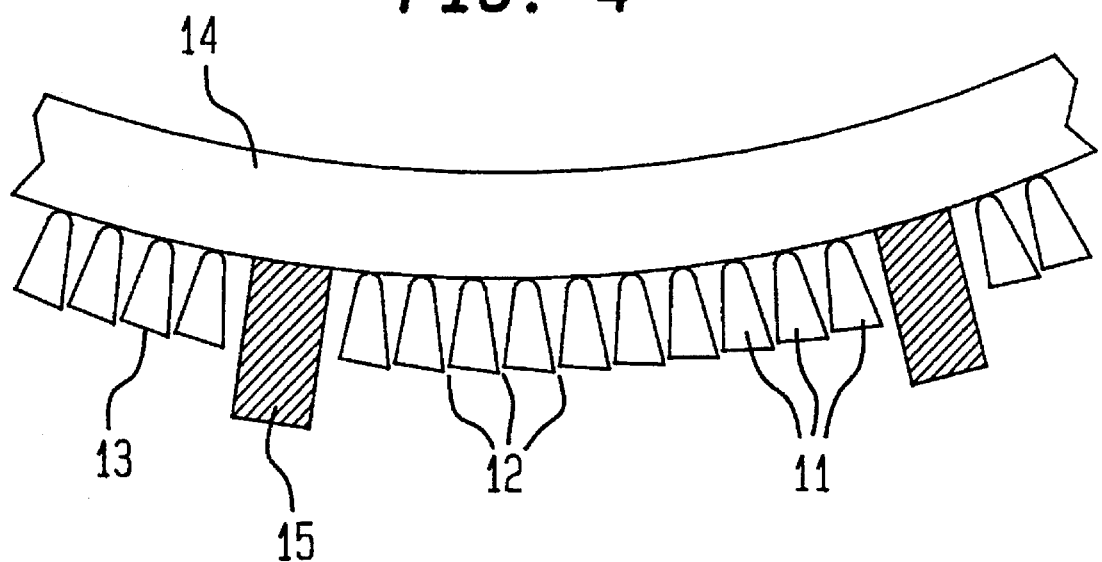
FIG. 4 is a partial, side, elevational view of a portion of another embodiment of a screening cylinder in accordance with the present invention.
Figure 5:
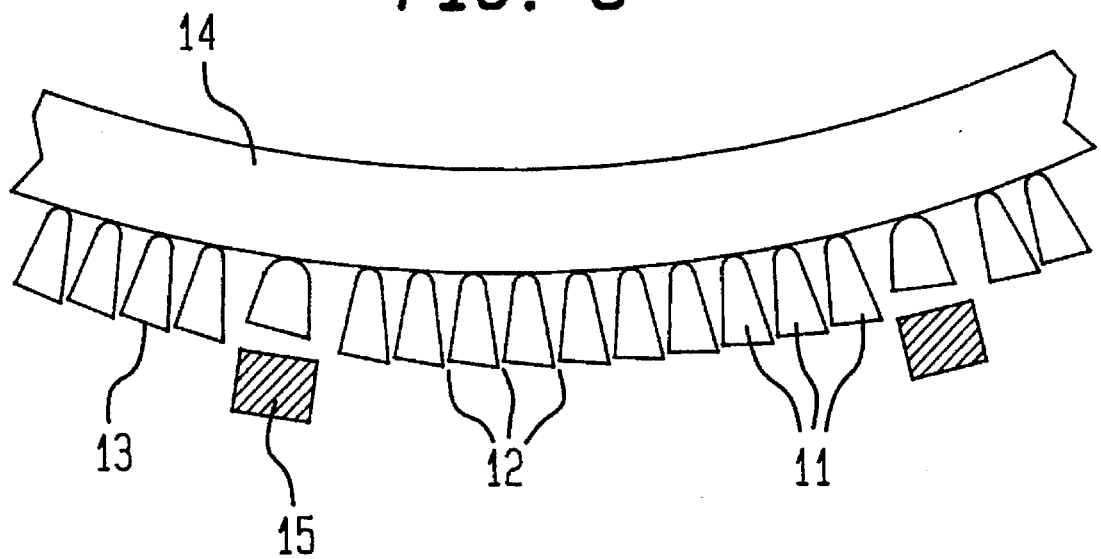
FIG. 5 is a partial, side, elevational view of a portion of another embodiment of a screening cylinder in accordance with the present invention.

According to the embodiment of this invention shown in FIG. 2, the strips 15 are inserted between the bar-shaped portions 11 and attached to the supporting rings 14. According to the embodiment shown in FIG. 3, the strips 15 are attached above the bar-shaped portions 11.

The strips 15 can have a rectangular cross-section or rounded upper edges, or may have some other configuration, which implies that during the screening process the strips give rise to strong extra pulses in the fiber suspension. Such pulses have proved to substantially improve the runnability of the screening device. The fluidization in the fiber suspension is improved, whereby smaller slit widths can be used while maintaining the same capacity, which yields a cleaner pulp without employing a greater number and/or larger screens. Furthermore, the long fiber fraction in the accept portion can be increased. It is also possible to screen fiber suspensions at high concentrations, for example up to about 7%, which in turn results in many further advantages, such as smaller pumps, smaller pipe dimensions, less space requirement, etc.

Although the invention herein has been described with reference to particular embodiments, it is to be understood that these embodiments are merely illustrative of the principles and applications of the present invention. It is therefore to be understood that numerous modifications may be made to the illustrative embodiments and that other arrangements may be devised without departing from the spirit and scope of the present invention as defined by the appended claims.

I claim:

1. An apparatus for screening suspensions of lignocellulose-containing fibrous material comprising a plurality of longitudinally extending bar elements separated by predetermined gaps formed therebetween of predetermined size which is sufficient to allow for the screening of fibrous material said bar elements having an inner surface and an outer surface and being formed into a screening cylinder, a plurality of supporting rings having an inner and an outer surface and being disposed circumferentially about said screening cylinder to support said plurality of bar elements in the form of said screening cylinder and disposed such that said supporting rings do not participate in screening, and a plurality of longitudinally extending strip members having inner surfaces and outer surfaces, said inner surfaces of said plurality of generally longitudinally extending strip members being disposed a first predetermined distance from said inner surface of said plurality of supporting rings and said inner surfaces of said plurality of bar elements being disposed a second predetermined distance from said inner surface of said plurality of supporting rings, said first predetermined distance being greater than said second predetermined distance.

2. The apparatus of claim 1 wherein said gaps have a width of between about 0.05 and about 1.0 mm.

3. The apparatus of claim 1 wherein said plurality of generally longitudinally extending strip members are arranged substantially axially with respect to said screening cylinder.

4. The apparatus of claim 1 wherein said plurality of generally longitudinally extending strip members are arranged at a predetermined angle with respect to said axial direction of said screening cylinder.

5. The apparatus of claim 1 wherein said outer surfaces of said plurality of longitudinally extending strip members are arranged in contact with said plurality of supporting rings.

6. The apparatus of claim 1 wherein said outer surfaces of said plurality of longitudinally extending strip members are arranged in contact with said inner surfaces of said plurality of bar elements.

7. The apparatus of claim 1 wherein said inner surfaces of said plurality of bar elements form an oblique angle with respect to the circumferential direction of said screening cylinder.

8. The apparatus of claim 7 wherein said oblique angle is between about 0° and 45°.

9. The apparatus of claim 8 wherein said oblique angle is between about 10° and 30°.

10. An apparatus for screening suspensions of lignocellulose-containing fibrous material comprising a plurality of longitudinally extending bar elements separated by predetermined gaps formed therebetween, said gaps being of a predetermined size which is sufficient to allow for the screening of fibrous material, said bar elements having an inner and an outer surface and being formed into a screening cylinder, said predetermined gaps thereby extending along the entire length of said screening cylinder, a plurality of supporting rings having an inner and outer surface and being disposed circumferentially about said screening cylinder to support said plurality of bar elements in the form of said screening cylinder and disposed such that said supporting rings do not participate in screening, and a plurality of generally longitudinally extending strip members having inner surfaces and outer surfaces, said outer surfaces of said plurality of generally longitudinally extending strip members being disposed a first predetermined distance from outer surfaces of said plurality of supporting rings and said outer surfaces of said plurality of bar elements being disposed a second predetermined distance from said outer surfaces of said plurality of supporting rings, said first predetermined distance being greater than said second predetermined distance.

11. The apparatus of claim 10, wherein said gaps have a width of between about 0.05 and about 1.0 mm.

12. The apparatus of claim 10, wherein said plurality of generally longitudinally extending strip members are arranged substantially axially with respect to said screening cylinder.

13. The apparatus of claim 10, wherein said plurality of generally longitudinally extending strip members are arranged at a predetermined angle with respect to said axial direction of said screening cylinder.

14. The apparatus of claim 10, wherein said inner surfaces of said plurality of longitudinally extending strip members are arranged in contact with the outer surface of said plurality of supporting rings.

15. The apparatus of claim 10, wherein said inner surfaces of said plurality of longitudinally extending strip members are arranged in contact with said outer surfaces of said plurality of bar elements.

16. The apparatus of claim 10, wherein said plurality of bar elements form an oblique angle with respect to the circumferential direction of said screening cylinder.

17. The apparatus of claim 16, wherein said oblique angle is between 0 and 45 degrees.

18. The apparatus of claim 17, wherein said oblique angle is between 10 and 30 degrees.

* * * * *

UNITED STATES PATENT AND TRADEMARK OFFICE
CERTIFICATE OF CORRECTION

PATENT NO. : 5,472,095
DATED : December 5, 1995
INVENTOR(S) : Malm

It is certified that error appears in the above-indentified patent and that said Letters Patent is hereby corrected as shown below:

Column 1, line 43, "Shives" should read --shives--.
Column 2, line 52, before "DETAILED DESCRIPTION" insert --Figure 6 is a partial view of a portion of another embodiment of a screening cylinder in accordance with the present invention.

Figure 7 is a partial view of a portion of another embodiment of a screening cylinder in accordance with the present invention.--

Signed and Sealed this

Fifth Day of March, 1996

Attest:

BRUCE LEHMAN

Attesting Officer

Commissioner of Patents and Trademarks